United States Patent [19]

Fujimoto et al.

[11] 4,417,529

[45] Nov. 29, 1983

[54] METHOD FOR MELTING AND TREATING WASTE

[75] Inventors: Tadao Fujimoto, Kobe; Hiroyuki Fujiuchi, Ibaraki; Kenichi Shimizu, Yokohama; Seiichiro Ueda, Kobe, all of Japan

[73] Assignee: Kubota Ltd., Osaka, Japan

[21] Appl. No.: 350,318

[22] Filed: Feb. 19, 1982

[30] Foreign Application Priority Data

Oct. 5, 1981 [JP] Japan .................................. 56-157467

[51] Int. Cl.³ ............................................... F23G 7/04
[52] U.S. Cl. ...................................... 110/346; 110/238
[58] Field of Search ............... 110/346, 235, 259, 251, 110/238

[56] References Cited

U.S. PATENT DOCUMENTS 4,331,088  5/1982  Gold ............................... 110/359 X
4,346,661  8/1982  Nakamura ....................... 110/235 X Primary Examiner—Edward G. Favors
Attorney, Agent, or Firm—W. G. Fasse; D. H. Kane, Jr.

[57] ABSTRACT

A method for melting and treating waste to be treated such as waste water treatment sludge and incinerated ash of garbage involves mixing the waste to be treated with an auxiliary fuel in powder, granular or solid form or in the form of mixture thereof which has its own calorie value. Powder coal, coal, coke, waste plastic material, saw-dust, waste paper, carbonized material and used tires can be used as an auxiliary fuel. In addition to the auxiliary fuel, an additive is admixed for adjusting the composition of the waste to have treated so as to be a specific composition ratio.

9 Claims, 3 Drawing Figures

METHOD FOR MELTING AND TREATING WASTE

BACKGROUND OF THE INVENTION

1. Field of the Invention

The present invention relates to a method for melting and treating waste such as sewage sludge, sludge of a water purification plant and incinerated ash of refuse.

Generally, waste water treatment sludge, for example, sewage sludge, is melted and treated after it has been incinerated so as to be collected as a solid slag. The waste like refuse including garbage is also treated in the same manner as the waste water treatment sludge or is incinerated in an incinerator and thereafter the resulting incinerated ash is melted and treated to be collected as a solid slag. Such slag collected from the waste is re-utilized as aggregate for road building, aggregate for building purposes and as a material for use in a waterway in a playground, a tennis court and even in a flower garden. The present invention can be generally applied to a method of melting and treating and the re-utilizing household waste and industrial waste.

2. Description of the Prior Art

Generally, it is necessary for the melting and treating waste such as sewage sludge, sludge of a water purification plant and incinerated ash of refuse, that such melting and treating is done at low cost.

Conventionally, the waste such as sewage sludge, sludge of a water purification plant and incinerated ash of refuse is melted and treated by a melting furnace having auxiliary burning means. In such a melting and treatment, oil has been generally used as an auxiliary fuel, because the amount of heat produced by burning of waste water treatment sludge and incinerated ash of refuse is insufficient for melting and treating such waste or it is not sufficient for obtaining a sufficient rate of treatment. Accordingly, in order to obtain a sufficient amount of heat for the melting treatment, and to obtain a sufficient rate of treatment, it is necessary to use a large amount of oil. However, oil is much too expensive and a limited resource. As a result, in a conventional melting and treating method using oil as a fuel the expenses are too high.

Particularly, sludge having a relatively high melting point, which is obtained from a water treatment in a water purification plant, needs a large amount of auxiliary fuel in a melting treatment process which requires an extremely high temperature inside a melting furnace. As a result, a problem arose because durability of furnace materials such as a fire-proof wall and the like which forms the melting furnace was lowered. An attempt to solve such problems has been made by mixing the waste with a melting-point depression agent so as to lower the melting-point of the waste. However, such melting-point lowering agent commercially available up to now is extremely expensive, so that the melting treatment cost per unit of the waste such as water treatment sludge has risen. In addition, in an even worse situation resulted because a larger amount of melting-point lowering agent than the amount of the waste to be treated had to be added and thus a plant or an apparatus for such a melting treatment is rather large.

Household wastes and industrial waste usually contain plastic material besides garbage. It is impossible to treat such plastic material or even if it is possible to treat it, it is extremely difficult to treat it. Therefore, it is preferred and desirable to economically carry out the treatment of such plastic material contained in the waste.

SUMMARY OF THE INVENTION

A principal object of the present invention is to provide a method for melting and treating waste such as water treatment sludge and incinerated ash of refuse wherein the costs for treatment are drastically reduced by decreasing the amount of oil to be consumed or by making the oil even unnecessary.

Another object of the present invention is to provide a melting and treating method capable of lowering the melting-point of the waste such as water treatment sludge and incinerated ash of refuse without using an expensive melting-point depression agent commercially available.

A further object of the present invention is to provide a method for melting and treating waste such as water treatment sludge and incinerated ash of refuse, while at the same time, treating the waste plastic material contained in the refuse.

In accordance with a broader aspect of the present invention, there is provided a method for melting and treating waste to be treated such as water treatment sludge and incinerated ash of refuse, which comprises the step of mixing the waste to be treated with an auxiliary fuel in powder, granular or massive form or in the form of a mixture powder, granular or solid fuel and melting the resulting mixture. As an auxiliary fuel in the form of solid coal, powder coal, coke, waste plastic, saw-dust, waste paper, carbonized material or used tires which has its own caloritic value can be used. Such mixture of the waste to be treated with the auxiliary fuel results in a substantial reduction of the amount of expensive oil to be consumed or makes the use of oil as a fuel unnecessary, so that the cost for melting and treating the waste can be effectively decreased.

In accordance with another aspect of the present invention, a melting and treating method is provided wherein the residue of the waste to be treated is used as an auxiliary fuel. Such residue is obtained by separating the plastic material, from the refuse which initially includes garbage and plastic material. Thereafter the remaining residue can be used as an auxiliary fuel. The separated plastic material can be reused.

In accordance with a further aspect of the present invention, a waste melting and treating method is provided which further comprises the step of mixing the waste to be treated with an additive in addition to the auxiliary fuel in powder, granular or massive or solid form or in the form of a mixture thereof, whereby the composition comprises 40~60% of $SiO_2$, 5~25% of $Al_2O_3$ and 15 55% of material consisting of substances selected from the classes containing FeO, CaO, $K_2O$ and $Na_2O$, whereby the melting-point can be depressed or lowered and the fluidity of slag can be increased, and thus a further reduction of the amount of oil to be consumed can be achieved and the durability of the melting furnace is substantially enhanced. In particular, in case of water treatment sludge having a relatively high melting-point, a desirable effect can be achieved. In addition, it is not necessary to use an expensive melting-point depression agent which is commercially available, since either the incinerated ash of the refuse, iron oxide and/or material having as the main component iron oxide can be utilized. Advantageously, such iron oxide or material having as the main component iron oxide is available at a low cost by utilizing the rust removed in ship building, or from piping or the shot peening of a product. Therefore, it is possible to effectively reduce the cost for melting and treating water treatment sludge and incinerated ash of refuse.

These objects and other objects, features, aspects and advantages of the present invention will become more apparent from the following detailed description of the present invention when taken in conjunction with the accompanying drawings.

DESCRIPTION OF PREFERRED EMBODIMENTS AND OF THE BEST MODE OF THE INVENTION

Figure 1:
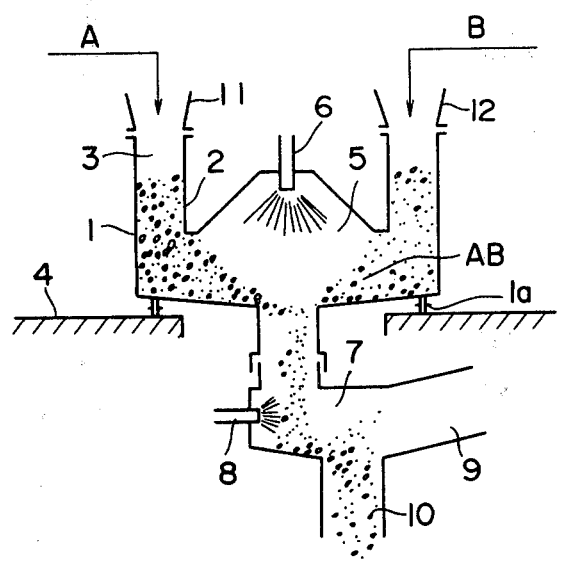
FIG. 1 is a schematical view of one example of a melting furnace for use in carrying out a waste melting and treating method of the present invention.

Referring to FIG. 1, an example of a melting furnace for use in a waste melting and treating method of the present invention will be explained. The furnace has an outer cylindrical tube 1 and an inner cylindrical tube 2 coaxial with the outer tube 1. A space defined between the outer tube 1 and the inner tube 2 constitutes a doughnut-like reservoir chamber 3. Two hoppers 11 and 12 are provided over the reservoir chamber 3 so that waste A to be treated, such as water treatment sludge or incinerated ash of refuse, is introduced into the chamber 3 through hopper 11 and various kinds of auxiliary fuel or additive material as described below are introduced into the chamber 3 through the other hopper 12. A roller or a cylindrical outer tube rotating means 1a is attached to the outer tube 1 so that the tube 1 is rotated along a circular track on a floor 4. A main combustion chamber 5 is formed under the inner tube 2, which communicates with the lower portion of the reservoir chamber 3. A burner 6 is mounted in the upper portion of the main combustion chamber 5, that is, in the central ceiling portion of the inner tube 2. A secondary combustion chamber 7 is provided under the main combustion chamber 5. A burner 8 is attached to one side wall of said secondary combustion chamber 7 and the gas duct 9 is connected in the direction opposite to the side wall attached to said burner 8 for discharging gas. In addition, a slag discharging duct 10 is connected to the bottom portion of the main combustion chamber 7 for discharging the slag obtained through a melting and treating process.

In the melting furnace as shown in FIG. 1, the waste A to be treated, such as waste water treatment sludge or incinerated ash of refuse, is entered into the hopper 11 by a conveyor or the like. A supply of waste A to be treated is held in the reservoir chamber 3. On the other hand, various kinds of auxiliary fuel or additive B as described below are entered, separately or mixed as desired into the hopper 12 and held in the reservoir chamber 3. Since the reservoir chamber 3 defines a doughnut-like space and since the outer tube 1 rotates on rollers 1a or the like, the waste A to be treated and the auxiliary fuel or the additive B in the reservoir chamber 3 fall down while being dispersed by the rotation of the outer tube 1 whereby they are uniformly mixed in the reservoir chamber 3. Since the melting furnace is constructed as schematically shown in FIG. 1, the mixture AB falling down in the reservoir chamber 3 is fed into the main combustion chamber 5 at a sloping angle as seen in FIG. 1. In melting and heating the mixture AB fed into the main combustion chamber 5 with a sloping angle, first of all, organic material contained in the waste A is burnt out by the burner 6 projected into the main combustion chamber 5. This burning results in a decomposition gas which is in turn burnt out. Hence the amount of heat resulting from both the combustion of the waste and the decomposition is generated in the main combustion chamber 5. This heat is applied to any inorganic material left in the waste A by radiant heat conduction, whereby the remaining portion of the waste A is melted and falls in turn, into the secondary combustion chamber 7. Further, the decomposition gas generated by combustion of the organic material is also introduced into the combustion chamber 7 in which the decomposition gas is perfectly burnt out with combustion air. The waste gas caused by the perfect combustion is discharged through the gas duct 9. If necessary, the waste gas is introduced to a chimney after the amount of heat of the waste gas is collected. On the other hand, the slag produced by the melting treatment process is discharged through a slag discharging duct 10. In this melting furnace, the waste A to be treated and the auxiliary fuel or the additive B are mixed by rotation in the reservoir chamber 3. Accordingly, the waste A and the auxiliary fuel or the additive B are effectively and uniformly mixed without using an additional mixing apparatus. The mixing rate can be arbitrarily varied by changing the amount of waste A and the auxiliary fuel or the additive B entered into the reservoir chamber 3. Each embodiment of the present invention as described in detail below can be carried out by using the melting furnace as explained in the foregoing with reference to FIG. 1.

The first embodiment of the present invention comprises the step of mixing the waste to be treated such as water treatment sludge and incinerated ash of refuse, with auxiliary fuel such as powder coal or coke, granular or solid form or in the form of a mixture thereof and melting the resulting mixture. In this embodiment, water treatment sludge, such as sludge produced in a water purification plant and sewage sludge, and incinerated ash of refuse can be used as the waste to be treated. Powder coal, coke or fine powdered sewage sludge and the like can be used as an auxiliary fuel in the powder, granular or massive form or in the form of a mixture thereof. However, it is not intended to limit these materials as an auxiliary fuel in the first embodiment. More particularly, any substance or material in powder, granular or crushed form which has its own calorific value may be used, since the first embodiment utilizes a so-called luminous flame effect. A "luminous flame effect" is obtained in case where fine grains of the auxiliary fuel exist in the combustion gas of organic material in the above described main combustion chamber 5 (see FIG. 1). The fine grains of the auxiliary fuel float and burn in the combustion gas whereby the amount of combustion heat of the organic material is effectively conducted to the remaining portion of the waste being treated through radiant heat conduction. Hence, it should be understood that the auxiliary fuel which can be used in this embodiment may comprise any material or substance having such a "luminous flame effect", that is, any material or substance in fine powder form which has its own calorific value is suitable.

In the following, embodied examples of experiments regarding a melting treatment method of the first embodiment will be explained.

EXAMPLE 1

The working state of the melting furnace as shown in FIG. 1 was examined by using incinerated ash of refuse as the waste to be treated and using powder coal as an auxiliary fuel. Table 1 indicates the composition of the incinerated ash of the refuse as the waste and the composition of the powder coal as the auxiliary fuel. Table 2 indicates the working states where the incinerated ash of the refuse as shown in Table 1 was mixed with the powder coal as shown in Table 1 in the addition rate of 0, 0.2 and ratio by weight, respectively.

TABLE 1

A mixture of incinerated ash of refuse and powder coal was melted:

(1) Characteristic of Incinerated Ash of Refuse
| | | |
|---|---|---|
| Water Content Rate | 40 ~ 50% | (44.5) |
| Ignition Loss | 20 ~ 30.7% | (23.7) |
| Lower Calorific Value | 1285 ~ 1440 Kcal/Kg-ds | (1365) |

(2) Characteristic of Powder Coal
| | |
|---|---|
| Water Content Rate | 9.63% |
| Lower Calorific Value | 5793 Kcal/Kg-ds |
| Carbon | 67.2% |
| Hydrogen | 5.5% |
| Oxygen | 16.3% |
| Nitrogen | 1.2% |
| Sulphur | 0.3% |

TABLE 2

| | Addition Rate | | |
|---|---|---|---|
| | 0 | 0.2 | 0.48 |
| | | Ratio by Weight | |
| Temperature of Main Chamber | 1470 | 1443 | 1439° C. |
| Amount of Slag Generated (Kg/h) | 142.7 | 128.4 | 132.5 |
| Amount of Oil Used (l/h) | 43.8 | 32.3 | 6.6 |
| Amount of Ash Treated (Kg-ds/h) | 187.0 | 168.3 | 173.7 |
| Fuel Consumption (Kg-oil/Kg ash) | 0.187 | 0.154 | 0.030 |

Note:
Addition rate refers to the ratio of weight of the powder coal to the incinerated ash of refuse.

As seen from Table 2, in case where the powder coal as the auxiliary fuel is not added, that is, in case where the addition rate is zero, the rate of fuel was 0.187 Kg-oil/Kg ash, whereas in case of the addition rate of 0.2, the rate of fuel is 0.154 Kg-oil/Kg ash and in case of the addition rate of 0.48, the rate of fuel is 0.030 Kg-oil/Kg ash. More particularly, in case of the addition rate of 0.48, the rate of fuel consumption is less than one sixth as compared to the case where no powder coal is added as auxiliary fuel. It should be understood from this result that of this example, the amount of expensive fuel is substantially reduced as the addition rate of the powder coal as auxiliary fuel increases. Therefore, it is possible to effectively reduce the necessary melting treatment cost for treating the same amount of incinerated ash.

EXAMPLE 2

Similar as in example 1, the melting was done in the melting furnace as shown in FIG. 1 and sewage sludge was used as the waste to be treated and powder coal was used as the auxiliary fuel. Table 3 indicates the composition of the sewage sludge and the composition of the powder coal used. Table 4 indicates three operation states of the melting furnace where powder coal was not added (addition rate 0), when the addition rate was 0.05, and when the addition rate was 0.10, respectively.

TABLE 3

Melting treatment where sewage sludge and powder coal were mixed:

(1) Characteristic of Sewage Sludge
| | |
|---|---|
| Moisture | 22% |
| Ash Content | 22.5% |
| Lower Calorific Value | 3760 Kcal/kg-ds |

(2) Powder Coal
the same as the example 1

TABLE 4

| | Addition Rate | | |
|---|---|---|---|
| | 0 | 0.5 | 0.10 |
| | | Ratio by Weight | |
| Temperature of Main Chamber | 1490 | 1495 | 1510° C. |
| Amount of Slag Generated (Kg/h) | 43.9 | 42.3 | 44.6 |
| Amount of Oil Used (l/h) | 20.1 | 16.3 | 9.0 |
| Amount of Sludge Treated (Kg-ds/h) | 195.0 | 188.0 | 198.2 |
| Fuel Consumption (Kg-oil/Kg-ds) | 0.082 | 0.069 | 0.036 |

Note:
Addition rate refers to the ratio of weight of powder coal to sewage sludge.

As seen from Table 4, for the zero addition rate, the ratio of fuel was 0.082 Kg-oil/Kg dry solid, whereas for the addition rate of 0.05, the ratio of fuel was 0.069 Kg-oil/Kg dry solid and for the addition rate of 0.10, the ratio of fuel was 0.036 Kg-oil/Kg dry solid. More particularly, similar to the example 1, it should be understood that the ratio of fuel was effectively reduced as the addition rate increased. Accordingly, it is possible to largely reduce the costs of melting sewage sludge.

Figure 2:
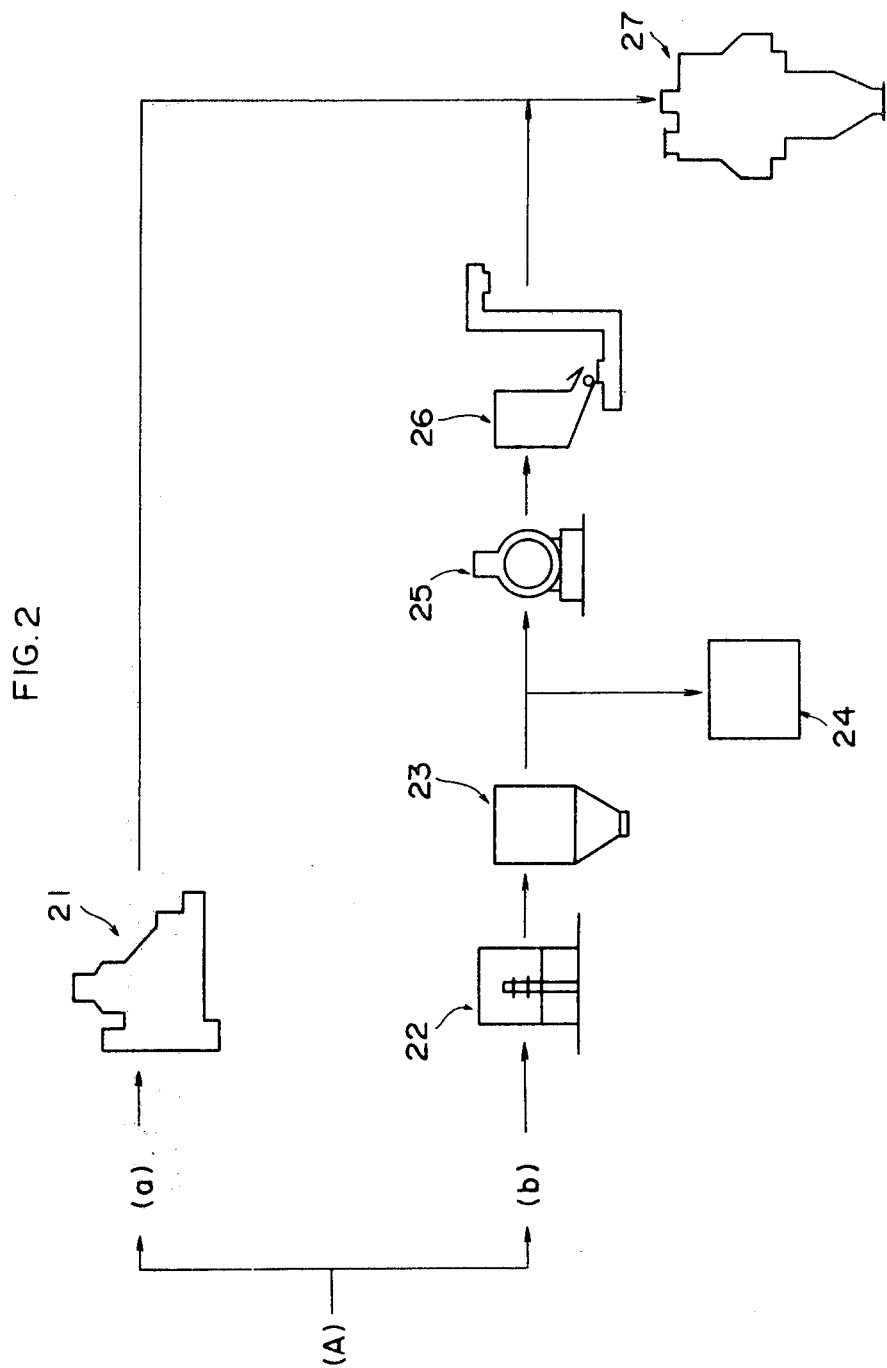
FIG. 2 is a flow diagram explaining an embodiment of the present invention wherein incinerated ash is used as the waste to be treated and is mixed with a waste plastic.

Next, the second embodiment of the present invention is directed to a melting treatment method which further comprises the step of mixing the waste to be treated such as a water treatment sludge and an incinerated ash of refuse, with waste plastic, saw-dust, waste paper, carbonized material or used tires as an auxiliary fuel in powder, granular or solid form or in the form of a mixture of these components. The second embodiment will be more clearly understood from the following description when taken in conjunction with the flow-sheet of FIG. 2. Referring to FIG. 2, a plastic component is removed as a waste plastic (b) from the refuse (A) (waste to be treated). The refuse (a) from which the waste plastic (b) was removed is supplied into a stoker type furnace 21 to be incinerated, which results in incinerated ash. On the other hand, the waste plastic (b) is primarily crushed and thereafter supplied to the hopper 23. Subsequently, the iron component contained in the primary crushed substance to be treated is removed and collected into at 24 by means of magnetic force. The substance from which the iron component was removed is supplied to the plastic crusher 25 wherein the substance is secondarily treated. Subsequently, the secondarily crushed substance is collected and supplied into the feed hopper 26.

The incinerated ash obtained by incinerating in the above described stoker furnace 21 and the crushed substance of the waste plastic (b) from the feed hopper 26 are supplied, each in predetermined amounts, into a melting furnace 27 in a mixed manner and melted therein. The melting furnace 27 is the same as the melting furnace shown in FIG. 1.

In supplying the incinerated ash from the stoker furnace 21 and the waste plastic from the feed hopper 26 into the melting furnace 27, such incinerated ash and waste plastic may be mixed prior to supply to the melting furnace 27, or may be mixed simultaneously with the supply or alternatively, may be automatically mixed within the melting furnace 27 after separately supplying the incinerated ash and the waste plastic, respectively. In summary, during the melting in the melting furnace 27, the incinerated ash and the waste plastic must be mixed. The process of crushing the waste plastic may be only a primary crushing step. A secondary crushing step is not necessarily required if all pieces of the waste plastic are less than 100 mm in diameter. However, a secondary crushing may be used for crushing the waste plastic to smaller sizes. In addition, in case where the plastic component is removed manually from the collected refuse or where a simplified automatic removal is employed it may not be necessary to remove all of the plastic components contained in the collected refuse.

In the following, the second embodiment will be described based on a complete experiment example.

EXAMPLE 3

Table 5 indicates the characteristic of the waste plastic and mixed ash used in this Example 3. The result of the melting treatment using waste plastic and mixed ash listed in Table 5 is shown in Table 6.

about half or one third by mixing with the waste plastic as listed in Table 5.

With regard to incinerated ash having the rate of moisture content of 40%, an experiment was made in the same condition as in Example 3. As a result, it was found that the amount of oil necessary for treatment of 1 ton of the incinerated ash was 60.5 l. Therefore, it should be understood that the amount of oil used as an auxiliary fuel can be substantially reduced by mixing with the waste plastic, irrespective of the rate of moisture content.

In accordance with another experiment wherein the mixing rate of the waste plastic to the incinerated ash is 35%, the amount of oil used as the auxiliary fuel became zero. Therefore, it was found that a melting with only the amount of heat retained in the mixed ash is possible under such condition.

As is apparent from the above described experiment examples, it should be understood that the amount of oil used as an auxiliary fuel can be effectively reduced by mixing the incinerated ash of refuse and the like with waste plastic. In addition, in accordance with the second embodiment it is possible to effectively re-utilize the waste plastic, which was conventionally impossible to treat. More particularly, not only the cost for the melting of the incinerated ash of refuse and the like is reduced, but also the treatment of the waste plastic has been made possible by the present teaching. Therefore, it should be understood that the efficiency of re-utilization of waste materials can be remarkably enhanced.

In the following, prior to description of the third embodiment of the present invention, the principle adopted in the third embodiment will be described. As described in the beginning of the specification, conventionally, in melting and treating waste such as water treatment sludge or incinerated ash of refuse, a melting-point lowering or depression agent has been admixed to the waste. The use of such melting-point depression agent leads to lowering of the melting-point of the substance to be treated, so that the auxiliary fuel necessary for melting is reduced and the durability of the melting furnace is enhanced due to lowering the temperature within the furnace. However, a problem still exists wherein the cost for the melting is raised because the melting-point depression agent commercially available is extremely expensive. Under the circumstances, the inventors of the present invention found through various experiments as described in detail below that the melting-point of the waste to be treated can be effectively reduced by adjusting the composition of the waste as follows:

$SiO_2$:40~60%

TABLE 5

CHARACTERISTIC OF WASTE PLASTIC AND MIXED ASH

| | Primary Crushed Plastic | Secondary Crushed Plastic | Mixture of Secondary Crushed Plastic and Incinerated Ash |
|---|---|---|---|
| Particle Size | less than 10 m/m 30%<br>10 m/m ~ 30 m/m 40%<br>more than 30 m/m 30% | less than 10 m/m 100% | less than 10 m/m 100% |
| Apparent Specific Gravity | 0.3 t/m$^3$ | 0.5 t/m$^3$ | 0.91 t/m$^3$ |
| Calorific Value | 7200 Kcal/Kg-ds | 7200 Kcal/Kg-ds | 2300 Kcal/Kg-ds |
| Mixing Rate | | | $\dfrac{\text{Waste Plastic}}{\text{Waste Plastic + Ash Including 20\% Water}} \times 100$ <br> = 27.3% |
| Water Content Rate | | | 14.5% |

TABLE 6

| Item | Amount per one Hour |
|---|---|
| Amount of Incinerated Ash Treated | 426 Kg/h |
| Amount of Waste Plastic Treated | 160 Kg/h |
| Amount of Mixed Ash Treated | 586 Kg/h |
| Amount of Slag Produced | 324 Kg/h |
| Amount of Auxiliary Oil Used | 25 l/h |

As seen from Table 6, in this experiment example, the amount of oil used as an auxiliary fuel will come to 25 l×1000/426=58.7 l per 1 ton of incinerated ash. This result compares favorably with treating the same incinerated ash of 1 ton heretofore whereby 130~150 l of oil were required when only the oil is used as an auxiliary fuel as in a conventional melting treatment method. Accordingly, it is possible to reduce the ratio of fuel to Al$_2$O$_3$:5~25%
material:15~55%
wherein the material refers to the substances selected from the classes comprising FeO, CaO, K$_2$O and Na$_2$O.

More particularly, the above described composition can be obtained by mixing the waste with a suitable material or substance for reducing the melting-point. The range of the comosition capable of lowering the melting-point of the waste is shown as a hatched portion in the composition diagram of FIG. 3. The composition in the hatched region shown in FIG. 3 indicates the range of the composition capable of being melted at the melting-point of less than 1300° C. Waste having a composition other than the region in FIG. 3 has a melting-point of above 1300° C. and thus cannot be melted at the temperature of 1300° C.

As described in the foregoing, in melting and treating water treatment sludge or incinerated ash of refuse, melting-point depression can be made by adjusting the composition of the above described composition. Thus, the material or substance added for adjusting the melting point of the composition is referred to as "additive" in this specification.

In the following, experiment examples for proving the above described principle will be described.

EXPERIMENT EXAMPLE 1

In case where the dewatered cake obtained by dewatering sludge in a water purification plant is melted, the dewatered cake and incinerated ash of the sewage sludge are mixed and supplied to the melting furnace to be melted. The ash content of the substance was the incinerated ash of sewage sludge. The ash was obtained by separating in a cyclone separator or the like after the dewatered cake obtained by biologically treating the sewage by way of activating the sludge and dewatering the same has been incinerated in an incinerator such as a fluidized furnace, and then collecting the separated ash. It should be pointed out that if and when the dewatered cake and the incinerated ash are mixed, such mixing may be made prior to supplying it into a melting furnace, or may be made simultaneously with supplying it into the melting furnace, or alternatively such mixing may be made within the melting furnace through a rotation of a hearth of the melting furnace.

Table 7 indicates the state of the melting treatment in case where the dewatered cake, as the waste to be treated, of sludge "A" from a water purification plant is mixed with the incinerated ash of the dewatered cake "B" of sewage sludge from a sewage treating plant, or the incinerated ash of the dewatered cake of sewage sludge "C" from a sewage treating plant and the resulting mixture is supplied to a muffle furnace and retained for ten minutes therein. In this experiment, the respective dewatered cake was retained in a heating furnace at the temperature of 800° C. for four hours to become ash, and such ash was further crushed into particles less than No. 24 mesh, which was used as a sample for the incinerated ash. The judging marks for the melting states listed in Table 7 are based on the criterion listed in Table 9.

The composition with reference to the ash content of each sample listed in Table 7 as described in the foregoing, is shown in Table 9.

TABLE 7

| Mixture | Mixing Rate Sludge of "A" Water Purification Plant:Mixture | 1200° C. | 1250° C. | 1300° C. |
|---|---|---|---|---|
| Incinerated | 100:0 | X | Δ | Δ |
| Ash of | 90:10 | X | Δ | Δ |
| Dewatered | 80:20 | X | O | O |
| Cake of "B" | 70:30 | Δ | O | ◎ |
| Sewage | 60:40 | Δ | O | ◎ |
| Sludge | 50:50 | Δ | ◎ | ◎ |
|  | 40:60 | Δ | ◎ | ◎ |
|  | 0:100 | O | ◎ | ◎ |
| Incinerated | 90:10 | X | Δ | O |
| Ash of | 80:20 | X | Δ | ◎ |
| Dewatered | 70:30 | Δ | O | ◎ |
| Cake of "C" | 60:40 | Δ | ◎ | ◎ |
| Sewage | 50:50 | O | ◎ | ◎ |
| Sludge | 40:60 | O | ◎ | ◎ |
|  | 0:100 | O | ◎ | ◎ |

Note:
Mixing rate is indicated by weight percent of ash content.

TABLE 8

| Mark | Condition | Description |
|---|---|---|
| X | Not Sintered | Sample is almost not changed. |
| Δ | Sintered | Only the surface is melted and such surface melting is visible |
| O | Molten | Whole sample is melted up to the center thereof, but the degree of softening is slight. |
| ◎ | Flow | Whole sample is almost melted and starts flowing. (Surface is lustrous) |

TABLE 9

| Composition per Ash Content | Dewatered Cakes of Sludge of "A" Water Purification Plant | Dewatered Cake of "Br" Sewage Sludge | Dewatered Cake of "C" Sewage Sludge |
|---|---|---|---|
| SiO$_2$ % | 33.1 | 31.1 | 37.0 |
| Al$_2$O$_3$ % | 30.6 | 10.5 | 10.6 |
| Ca % | 23.6 | 21.7 | 16.6 |
| Fe % | 2.41 | 10.9 | 13.4 |
| K % | 1.09 | 0.86 | 1.07 |
| Na % | 0.54 | 0.35 | 0.102 |
| Mg % |  | 1.59 | 1.46 |

Figure 3:
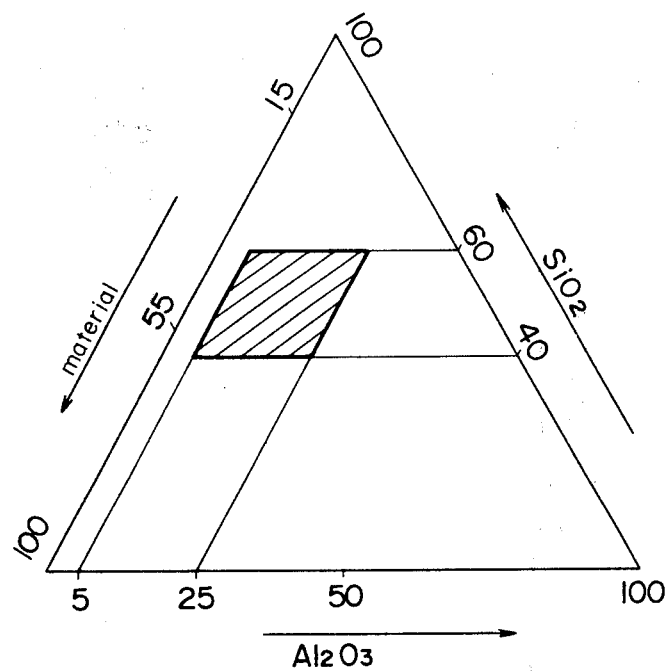
FIG. 3 is a composition diagram for explaining the principle of another embodiment of the present invention, showing the composition of the region that can be melted and treated at the melting-point of less than 1300° C.

As seen from the result of Tables 7 to 9, when only the sludge from a "A" water purification plant is treated, the melted sewage sludge did not flow even if the temperature was raised up to 1400° C., whereas when the sludge "A" from the water purification plant was mixed with more than 30% of the incinerated ash of the dewatered cake of sewage sludge "B" from a sewage treating plant or the incinerated ash of the dewatered cake of the sewage sludge "C" from a sewage treating plant, the melted waste flowed at the temperature of 1300° C. and further, in case of more than 50%, the melted waste flowed at the temperature of 1250° C. Since the composition of sludge in a waste purification plant as the waste to be treated was adjusted to the composition range as shown in FIG. 3, the melting-point was largely decreased.

EXPERIMENT EXAMPLE 2

In the Experiment Example 2, the dewatered cake obtained from dewatering treatment of sludge in a water purification plant was used as the waste to be treated and iron oxide or a material or substance the main component of which is iron oxide was used as an additive. Such iron oxide material could be obtained, for example, from waste material resulting from shot peening of a product or from the rust removed from a ship or from piping. More particularly, the dewatered cake of the sludge in a water purification plant as the waste to be treated was melted and treated in the melting furnace by mixing such waste material. It should be pointed out that if and when the dewatered cake and the iron oxide or the material having an iron oxide content as a main component are mixed, such mixing may be made prior to supplying it into the melting furnace, or the mixing may take place simultaneously with the supplying, or alternatively the materials to be mixed may be separately supplied to the melting furnace and be mixed within the melting furnace by rotation of the hearth of the melting furnace. The melting treatment was done by retaining the waste in the muffle furnace for ten minutes in a manner similar to the above described Experiment Example 1. For the purpose of comparison, the result wherein a melting-point depression agent (sold as a product of "Flux Mz" and commercially available) was used, is listed in Table 10. The "Flux Mz" includes soda ash ($Na_2CO_3$), about 40~50%, as a main component and boron (B), CaO and the like.

The judging marks of the condition of the melting treatment described in Table 10 are the same as those described in Table 8.

TABLE 10

| Additive | Temperature | Additional Rate of Additive | | | | |
|---|---|---|---|---|---|---|
| | | 0% | 3% | 5% | 8% | 10% |
| Melting Point Depression Agent Commercially Available | 1250° C. | — | — | Δ | Δ | Δ |
| | 1300° C. | Δ | Δ | Δ | O | ⊚ |
| $Fe_2O_3$ | 1250° C. | — | — | Δ | Δ | Δ |
| | 1300° C. | Δ | Δ | Δ | O | ⊚ |
| $Fe_2O_4$ | 1250° C. | — | — | Δ | Δ | Δ |
| | 1300° C. | Δ | Δ | O | ⊚ | ⊚ |

Note:
Additional rate indicates weight percent of additive to ash content of sludge obtained in a certain water purification plant.

As shown from Table 10, in this Experiment Example 2, the sludge from a water purification plant cannot be melted even at the temperature of 1300° C. However, where the sludge was mixed with ferric oxide of more than 10% or with tri-iron tetraoxide of more than 8%, the melted waste flowed. Accordingly, as compared to the case without any additive, a large melting-point depression can be achieved by mixing with iron oxide or tri-iron tetraoxide. In addition, as seen from Table 10, it should be understood that the effect of ferric iron or tri-iron tetraoxide is the same as that of the melting-point depression agent "Flux Mz" which is commercially available but is much more expensive because such ferric oxide and tri-iron tetraoxide are available as waste material obtained by shot peening of a product or in the form of rust removed from ships or piping. Therefore, it can be said that the same effect as that of an expensive melting-point depression agent can be achieved by utilizing waste material which can be obtained at a very low cost. In the Experiment Example 2, although the melting of the dewatered cake of the sludge in a water purification plant as the waste to be treated can be decreased by utilizing ferric iron and tri-iron tetraoxide, it should be noted that such effect results from the fact that the composition of the waste to be treated was adjusted to the composition as shown in FIG. 3 by mixing with ferric oxide and tri-iron tetraoxide. More particularly, since the dewatered cake used in the Experiment Example 2 had a composition less than the composition contained in the region hatched in FIG. 3, such composition was adjusted to become a composition falling in the region hatched in FIG. 3 by mixing with ferric oxide or tri-iron tetraoxide. Therefore, from the Experiment Example 2, it can be concluded that the use of iron oxide or material having iron as the main component as an additive is advantageous only if the concentration of the composition of the waste to be treated is within the region shown in FIG. 3.

EXPERIMENT EXAMPLE 3

In the Experiment Example 3, the dewatered cake obtained by a dewatering treatment of sludge in a water purification plant was used as the waste to be treated and the mixture of incinerated ash of the dewatered cake and sewage sludge, and iron oxide or material having iron oxide as the main component was used as an additive. The incinerated ash of the sewage sludge is the same as that of the above described Experiment Example 1. In addition, the melting treatment method used in Experiment Example 3 is also the same as the method described in the Experiment Examples 1 and 2. The different point is that the mixture of the incinerated ash of the dewatered cake of the sewage sludge and iron oxide or material having iron oxide as the main component is used as an additive. Table 11 indicates the results in case where the dewatered cake of the sludge "A" of a water purification plant was mixed with the incinerated ash of the dewatered cake of the sewage sludge "B" of a sewage treating plant at the rate of 1 to 1, and the resulting mixture was mixed separately with ferric oxide ($Fe_2O_3$), tri-iron tetraoxide ($Fe_3O_4$) and a melting-point depression agent commercially available, and supplied to the muffle furnace in which the mixture was retained for ten minutes. Table 12 indicates the composition of the dewatered cake of the sludge "A" and the composition by ash content of the dewatered cake of the sewage sludge "B". The judging marks of the melting condition of Table 11 are the same as those in Table 8.

TABLE 11

| Sewage Sludge | Additive | Addition Rate | Temperature | | |
|---|---|---|---|---|---|
| | | | 1200° C. | 1250° C. | 1300° C. |
| Incinerated Ash of Dewatered Cake of B Sewage Treatment Plant | Melting Point Depression Agent Commercially Available | 0% | X | Δ | Δ |
| | | 3% | — | Δ | Δ |
| | | 5% | — | Δ | ⊚ |
| | | 10% | — | Δ | ⊚ |
| | $Fe_2O_3$ | 0% | X | Δ | Δ |
| | | 3% | — | Δ | Δ |
| | | 5% | — | Δ | ⊚ |
| | | 10% | — | Δ | ⊚ |

TABLE 11-continued

| Sewage Sludge | Additive | Addition Rate | Temperature | | |
|---|---|---|---|---|---|
| | | | 1200° C. | 1250° C. | 1300° C. |
| | Fe₃O₄ | 0% | X | Δ | Δ |
| | | 3% | — | Δ | Δ |
| | | 5% | — | Δ | ◎ |
| | | 10% | — | Δ | ◎ |

Note:
Additional rate indicates weight percent of additive to ash content of sludge "A" from a water purification and ash content "Br" of a sewage sludge.

TABLE 12

| Composition per Ash Content | Sludge in "A" Water Purification Plant | "B" Sewage Sludge |
|---|---|---|
| SiO₂ % | 33.1 | 22.0 |
| Al₂O₃ % | 30.6 | 6.68 |
| Ca % | 23.6 | 32.2 |
| Fe % | 2.41 | 7.37 |
| K % | 1.09 | 0.71 |
| Na % | 0.54 | 0.37 |
| Mg % | | 1.16 |

As seen from Tables 11 and 12, the sludge "A" and the sewage sludge "B" are mixed at the rate of 1 to 1 and, in addition, ferric oxide (Fe₂O₃) and tri-iron tetraoxide (Fe₃O₄) of more than 5%, respectively, are added at the temperature of 1300° C., so that the waste to be treated has the composition shown in the hatched portion in FIG. 3 and thus melts very easily. Similarly, as seen from the examples for comparison listed in Table 11, it should be understood that an effect similar to that of a commercially available melting-point depression agent can be obtained.

As described in the foregoing, since the melting-point of the waste to be treated can be decreased by mixing the waste with another waste different from the waste to be treated, or iron oxide so that the above described specific composition can be obtained, the amount of oil necessary for the melting of the waste to be treated can be reduced substantially. The lowering of the melting-point signifies that the furnace operating temperature within a melting furnace can be lowered, and thus the durability of the melting furnace can be enhanced.

The third embodiment of the present invention resides in a melting treatment method which further comprises the step of adjusting the above described composition, based on the above described principle, together with the waste to be treated and the auxiliary fuel used in the first and second embodiments as described in the foregoing. More particularly, the third embodiment is directed to a method wherein the waste to be treated, such as water treatment sludge or incinerated ash of refuse is mixed with an auxiliary fuel in powder, granular or crushed form and with the above described additive so that the composition can be adjusted to be included in the hatched region in FIG. 3. As described in the first and second embodiments, powder coal and coke or waste plastic or used tires can be used as the auxiliary fuel. As can be seen from the above described Experiment Examples 1 to 3, the incinerated ash of the waste different from the waste to be treated, iron oxide or material having iron oxide as a main component and the like can be used as an additive. Here again the iron oxide or the material having iron oxide as a main component may be the waste obtained by shot peening a product or the rust removed from a ship or piping. Such admixing of the additive may be made simultaneously with mixing of the auxiliary fuel or may be made after mixing with the auxiliary fuel.

In accordance with the third embodiment, the conduction of heat of combustion caused by combustion of organic material within a melting furnace can be effectively enhanced and thus the amount of oil necessary for the melting can be substantially reduced, since the waste to be treated is mixed with an auxiliary fuel in powder, granular or solid form or in the form of a mixture thereof. In addition to this, it is possible to further reduce the amount of oil necessary for the melting since the composition of the waste to be treated itself is adjusted to fall into the hatched region in FIG. 3 by using an additive as described in the foregoing so as to lower the melting-point and thus increasing the fluidity of the slag. More particularly, as compared with the first and second embodiments, the third embodiment can further reduce the amount of oil necessary as auxiliary fuel. What is even more important, since the melting temperature can be lowered if the melting-point of the waste to be treated is lowered by the composition adjustment, the furnace operating temperature in the melting furnace can be lowered. Accordingly, the durability of the melting furnace can be enhanced.

The third embodiment of the present invention is a combination of two technical ideas, one being an idea of adding auxiliary fuel to the waste to be treated as described in the first and second embodiments, and the other being an idea of adding an additive as for the composition adjustment shown by the above described Experiment Examples.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for melting and treating waste to be treated such as waste water treatment sludge and incinerated ash of garbage, comprising the following steps; mixing the waste to be treated with an auxiliary fuel in powder, granular or solid form or in the form of a mixture of powder, granular and solid fuel components, which has its own calorie value, further mixing said waste to be treated with an additive so that said waste to be treated has the composition ratio of 40~60% of SiO₂, 5~25% of Al₂O₃ and 15~55% (by weight) of material consisting of the substances selected from the classes containing FeO, CaO, K₂O and Na₂O and melting the resulting mixture.

2. The method in accordance with claim 1, wherein said auxiliary fuel in powder, granular or massive form or in the form of a mixture thereof comprises powder coal or coke.

3. The method in accordance with claim 1, wherein said waste to be treated comprises a waste water treatment sludge, and said additive comprises an incinerated ash of the waste.

4. The method in accordance with claim 3, wherein said additive is mixed with iron oxide or a substance the main component of which is iron oxide.

5. The method in accordance with claim 1, wherein said additive comprises iron oxide or a substance the main component of which is iron oxide.

6. The method in accordance with claim 4 or 5, wherein iron oxide or said substance comprises a waste material including iron oxide.

7. The method in accordance with claim 1, wherein said waste to be treated comprises a sludge from a water purification plant, and said additive comprises a sewage sludge.

8. The method in accordance with claim 1, wherein said waste to be treated comprises a sewage sludge, and said additive comprises a sludge from a water purification plant.

9. The method in accordance with claim 1, wherein said waste to be treated and said additive comprise two sewage sludges which have different compositions relative to each other.

* * * * *